(12) United States Patent
Ferraro et al.

(10) Patent No.: US 10,945,525 B2
(45) Date of Patent: Mar. 16, 2021

(54) SELF-ADJUSTMENT RESTRICTOR

(71) Applicant: Carpin Manufacturing, Inc., Waterbury, CT (US)

(72) Inventors: David Ferraro, Cheshire, CT (US); Ralph Carpinella, Woodbury, CT (US)

(73) Assignee: Carpin Manufacturing, Inc., Waterbury, CT (US)

( * ) Notice: Subject to any disclaimer, the term of this patent is extended or adjusted under 35 U.S.C. 154(b) by 0 days.

(21) Appl. No.: 15/977,132

(22) Filed: May 11, 2018

(65) Prior Publication Data

US 2018/0325259 A1 Nov. 15, 2018

Related U.S. Application Data

(60) Provisional application No. 62/505,460, filed on May 12, 2017.

(51) Int. Cl.
| | | |
|---|---|---|
| *A47B 91/02* | (2006.01) | |
| *A47B 13/02* | (2006.01) | |
| *A47C 3/24* | (2006.01) | |
| *A47C 7/00* | (2006.01) | |
| *F16B 43/00* | (2006.01) | |
| *A47B 9/04* | (2006.01) | |

(52) U.S. Cl.
CPC .......... *A47B 91/022* (2013.01); *A47B 13/021* (2013.01); *A47B 91/024* (2013.01); *A47C 3/24* (2013.01); *A47C 7/008* (2013.01); *A47B 9/04* (2013.01); *F16B 43/00* (2013.01)

(58) Field of Classification Search
CPC ....... A47B 91/022; A47B 9/04; A47B 13/021; A47B 91/024; F16B 43/00; F16B 37/043; F16B 21/20; A47C 3/24; A47C 7/008

USPC .......... 411/182, 176, 302, 303, 188.2, 118.4, 411/118.5, 525, 526; 248/288.2, 188.4, 248/188.5
See application file for complete search history.

(56) References Cited

U.S. PATENT DOCUMENTS

| | | | | |
|---|---|---|---|---|
| 234,967 | A * | 11/1880 | Courtenay | F16B 39/34 411/303 |
| 267,862 | A * | 11/1882 | Fletcher | F16B 39/34 411/303 |
| 531,245 | A * | 12/1894 | Anderson | B60B 3/14 301/114 |
| 944,461 | A * | 12/1909 | Olander | A47B 91/024 248/188.4 |
| 972,287 | A * | 10/1910 | Swift | |
| 1,848,347 | A * | 3/1932 | Jarvis | B60B 33/0002 16/39 |

(Continued)

FOREIGN PATENT DOCUMENTS

| | | | | |
|---|---|---|---|---|
| GB | 786713 A | * | 11/1957 | .............. F16B 39/26 |
| GB | 1496609 A | * | 12/1977 | ........... E03C 1/0401 |

*Primary Examiner* — Kimberly T Wood
(74) *Attorney, Agent, or Firm* — Carmody Torrance Sandak & Hennessey LLP

(57) ABSTRACT

A device that prevents the self-adjustment of a leveling glide for the tubular legs of various types of furniture, including tables and chairs, is disclosed. The device comprises a threaded insert for a furniture leveling assembly that includes a polymeric washer secured to the bottom of the threaded insert. The polymeric washer is aligned with the axis of the internally threaded of the threaded insert and has a hole diameter that is smaller than the diameter of the externally threaded stem of the leveling glide.

11 Claims, 1 Drawing Sheet

(56) References Cited

U.S. PATENT DOCUMENTS

| | | | | |
|---|---|---|---|---|
| 1,874,462 A | * | 8/1932 | Crowther | F16B 39/26 238/244 |
| 2,024,728 A | * | 12/1935 | Galson | F16F 1/3814 16/19 |
| 2,145,037 A | * | 1/1939 | Bennett | A47B 91/04 16/44 |
| 2,235,078 A | * | 3/1941 | Meisterhans | F16B 5/02 411/82.2 |
| 2,254,973 A | * | 9/1941 | Nalle | A47B 91/04 16/19 |
| 2,283,850 A | * | 5/1942 | Danforth | F16B 39/34 411/303 |
| 2,320,031 A | * | 5/1943 | Danforth | F16B 39/34 411/302 |
| 2,321,497 A | * | 6/1943 | Luce | F16B 37/02 411/303 |
| 2,421,201 A | * | 5/1947 | Hallock | F16B 37/044 411/84 |
| 2,495,037 A | * | 1/1950 | Tinnerman | F16B 37/044 411/112 |
| 2,544,096 A | * | 3/1951 | Laughlin | B24B 45/00 403/228 |
| 2,616,474 A | * | 11/1952 | Healy | F16B 37/12 411/303 |
| 2,649,126 A | * | 8/1953 | Tinnerman | B60Q 1/0683 411/113 |
| 2,680,326 A | * | 6/1954 | Sultan | A47B 91/024 248/188.4 |
| 2,723,699 A | * | 11/1955 | Edwin | F16B 39/34 37/457 |
| 2,943,661 A | * | 7/1960 | Stern | F16B 5/128 411/134 |
| 2,981,651 A | * | 4/1961 | Arnold | C09J 123/22 411/542 |
| 3,040,796 A | * | 6/1962 | Gouverneur, II | F16B 33/004 411/303 |
| 3,104,493 A | * | 9/1963 | Nalle | A47B 91/028 248/188.4 |
| 3,131,505 A | * | 5/1964 | Cruikshank | A47B 91/028 248/188.4 |
| 3,175,795 A | * | 3/1965 | Adams | A47B 91/024 248/188.4 |
| 3,203,459 A | * | 8/1965 | Coldren | F16B 39/34 411/260 |
| 3,722,565 A | * | 3/1973 | Miller, Jr. | A47B 91/024 248/188.4 |
| 3,868,079 A | * | 2/1975 | Johnson | A47B 91/024 248/188.4 |
| 4,600,343 A | * | 7/1986 | Frerejacques | B23P 19/10 411/303 |
| 4,731,900 A | * | 3/1988 | Frobose | B60B 33/0002 16/38 |
| 4,810,144 A | * | 3/1989 | Martelli | F16B 9/026 411/182 |
| 4,813,550 A | * | 3/1989 | Saeks | A47B 96/1408 211/17 |
| 5,092,550 A | * | 3/1992 | Bettini | E05F 5/022 248/188.4 |
| 5,230,581 A | * | 7/1993 | Deng | F16B 7/18 403/260 |
| 5,292,095 A | * | 3/1994 | Cattaneo | A47B 91/028 248/188.4 |
| 5,503,492 A | * | 4/1996 | Stevens | F16B 7/0413 16/42 T |
| 5,697,586 A | * | 12/1997 | Lybarger | D06F 39/125 248/188.2 |
| 5,881,979 A | * | 3/1999 | Rozier, Jr. | A47B 91/024 248/188.4 |
| 6,027,086 A | * | 2/2000 | Heitlinger | A47B 91/024 248/188.5 |
| 6,036,421 A | * | 3/2000 | Demaray | F16B 43/00 411/169 |
| 6,327,985 B1 | * | 12/2001 | Frenkler | A47B 9/00 108/147.19 |
| 6,354,231 B1 | * | 3/2002 | Morris | A47B 91/028 108/144.11 |
| 6,416,266 B2 | * | 7/2002 | Schwarz | B60R 13/0206 411/112 |
| 6,478,270 B2 | * | 11/2002 | Parisi | A47B 91/024 16/32 |
| 6,810,561 B1 | * | 11/2004 | Liu | B60B 33/0002 16/31 A |
| 7,775,489 B2 | * | 8/2010 | Facis | A47B 91/00 248/188.2 |
| 9,523,381 B1 | * | 12/2016 | Carpinella | B60B 33/0002 |
| 2004/0047710 A1 | * | 3/2004 | Lauchner | F16B 13/0808 411/340 |
| 2006/0253975 A1 | * | 11/2006 | Rogers | E03C 1/20 4/688 |
| 2006/0277812 A1 | * | 12/2006 | Cole | F41A 35/04 42/96 |
| 2007/0291141 A1 | * | 12/2007 | Thorell | H04N 9/646 348/241 |
| 2007/0292241 A1 | * | 12/2007 | Snow | F16B 39/225 411/542 |
| 2008/0050203 A1 | * | 2/2008 | Dowling | F16B 5/02 411/531 |
| 2009/0211058 A1 | * | 8/2009 | Nagayama | F16B 23/00 16/446 |
| 2015/0139724 A1 | * | 5/2015 | Carpinella | B60B 33/0002 403/361 |
| 2016/0177985 A1 | * | 6/2016 | Pailhories | F16B 5/0258 156/293 |

\* cited by examiner

SELF-ADJUSTMENT RESTRICTOR

FIELD OF THE INVENTION

The prevent invention relates generally to a restrictor that limits the ability of an externally threaded stem to turn within an internally threaded nut, and more specifically, to a device that prevents the self-adjustment of a glide or leveler for tubular legs of various types of furniture, including tables and chairs.

BACKGROUND OF THE INVENTION

Furniture, most commonly institutional tables and chairs, are typically constructed using tubular legs. Threaded inserts are commonly used to fit into the end of a tubular member, such as a tubular table leg, for the purpose of closing off the open end of the tube as well as providing a threaded receptacle into which a glide or leveler can be threaded. The glide is used to provide a finished surface for the table, for example, to make contact with the floor and is used for adjustment. A furniture installer or user can adjust the height of each table leg by turning the glide about the threaded insert.

However, since the typical fit between the commercial-grade internally threaded nut of the threaded insert and externally threaded stem of the glide can vary and can sometimes be very free fitting, especially when interacting with the ground and experiencing vibration, the glides can self-rotate inside the threaded insert and can alter their pre-set heights. This can occur, for example, during moving and relocating of the table. These new heights may not be the desired heights, causing an unlevel condition on the table, that will require manually adjustment to return the heights to the desired settings.

Therefore, it can be seen that there is a need in the industry to make glides that are less likely to rotate within the threaded insert and to resist self-adjustment without specific user intervention.

Various products and techniques have been suggested for this purpose. However, none of these products or techniques work well enough or they are prohibitively expensive.

Thread lockers, which comprise a chemical coating on one or both of the threads, are difficult to apply with the necessary precision and result in not enough resistance to self-adjustment or too much resistance which prohibits easy adjustment. Higher quality threads, which more tightly match each other, are feasible but are too expensive to mass produce. Jam nuts and lock washers require an additional element and, accordingly, installation time and cost is increased. They also prevent easy re-adjustment once installed. Likewise, lock nuts are one-way fasteners that are relatively expensive and prevent easy re-adjustment once installed. Given these deficiencies, there remains a need in the industry to simply, inexpensively and yet effectively restrict movement of an internally threaded nut around an externally threaded stem.

SUMMARY OF THE INVENTION

The prevent invention is designed to cheaply, easily and effectively restrict the ability of an externally threaded stem to turn within an internally threaded nut, and specifically, to a device that prevents the self-adjustment of a leveling glide for the tubular legs of various types of furniture, including tables and chairs.

More specifically, the invention is directed to a threaded insert for a furniture leveling assembly, the threaded insert comprising:

a) an internally threaded surface that is configured to accommodate an externally threaded stem of a leveling glide; and b) a polymer washer secured to the bottom of the threaded insert, wherein a diameter of a hole of the washer is smaller than a diameter of the externally threaded stem of the leveling glide; and wherein, an axis of a hole of the washer is aligned with an axis of the internally threaded of the threaded insert.

In another embodiment, the furniture leveling assembly also includes a leveling glide with an externally threaded stem and also optionally, but preferably, includes a clip configured to interact with a tubular furniture leg.

BRIEF DESCRIPTION OF THE FIGURES

For a fuller understanding of the invention, reference is made to the following description taken in connection with the accompanying figures, in which.

Also, while not all elements may be labeled in each figure, all elements with the same reference number indicate similar or identical parts.

DETAILED DESCRIPTION OF THE PREFERRED EMBODIMENTS

Figure 2:
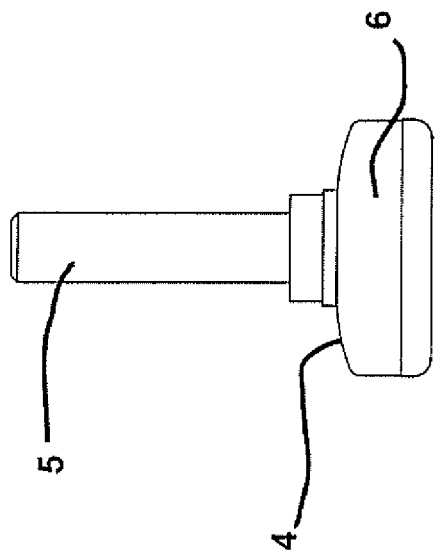
FIG. 2 depicts a leveling glide 4 that includes an externally threaded stem 5 and a base 6.
Figure 1:
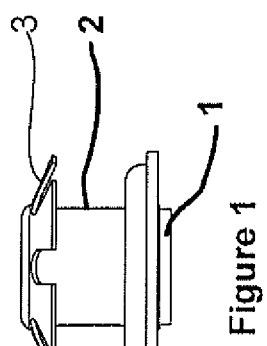
FIG. 1 depicts a threaded insert 2 with a polymer washer 1 adhered to the underside of the insert 2. The particular threaded insert depicted includes a round spring clip 3 that interacts with a tubular furniture leg. [EXISTING FIGURE]
Figure 3:
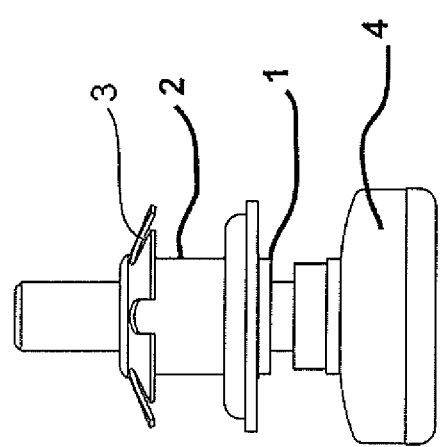
FIG. 3 depicts a furniture leveling assembly that includes the leveling glide 4 threaded into the threaded insert 2 with the polymer washer 1 adhered to the underside of the threaded insert 2.

In one embodiment, the present invention relates generally to a threaded insert for a furniture leveling assembly, the threaded insert comprising:

a) an internally threaded surface that is configured to accommodate an externally threaded stem of a leveling glide; and b) a polymer washer secured to the bottom of the threaded insert, wherein a diameter of a hole of the washer is smaller than a diameter of the externally threaded stem of the leveling glide; and wherein, an axis of a hole of the washer is aligned with an axis of the internally threaded of the threaded insert.

As used herein, "a," "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath", "below", "lower", "above", "upper", "front", "back", and the like, are used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

As described herein, the threaded insert of the invention comprises a polymer washer 1 that has an adhesive on one side for adhering or securing the washer to an internally threaded insert 2, wherein the axis of the hole of the washer is aligned to the axis of the internally threads of the threaded insert.

Externally threaded stem 5 of the glide 4 is inserted through the polymer washer 1 and into the threaded insert 2, so that the axis of the stem, the axis of the threads of the threaded insert 2, and the axis of the hole of the washer 1 are all aligned. The washer 1 has a thickness and center hole diameter sufficient to interfere with the threads of the stem 5 and put pressure on the stem 5. Such pressure can be increased by utilizing thicker washers, smaller diameter holes, firmer polymer material or some combination of these.

The furniture leveling assembly described herein generally include two components: a leveling glide 4 and an internally threaded insert 2. The leveling glide 4 typically includes an externally threaded stem 5 and a base 6. The externally threaded stem 5 generally has a diameter of ¼-20, 5/16-18, or ⅜-16. The stem 5 is connected to a base 6 that is either fixed or swivels. The swiveling base attempts to avoid wobbling on uneven floors. The base 6 has a smooth bottom surface to protect the floor from damage and generally comprises metal, nylon, felt, or some combination thereof.

The furniture leveling assembly also includes a threaded insert 2 that interacts with the tubular leg of the furniture. The threaded insert 2 includes an internally threaded surface that is designed to accommodate the externally threaded stem 5 of the glide 4. The threaded insert 2 may also include various types of clips, such as square spring clips, round spring clips 3, holding clips, t-clips and the like, all of which are designed to interact with various types of furniture in different ways.

The polymer washer 1 of the invention may be included with the threaded insert 2 of the furniture leveling assembly when originally manufactured, or it may be sold separately and applied to either new or used leveling assemblies.

The washer 1 of the present invention preferably comprises a flexible polymer material that exhibits high resiliency and impact absorption. Examples of suitable materials include polymers such as isolene, isoprene, butadiene, styrene, chloroprene, isobutylene, polybutadiene, styrene-butadiene, epichlorohydrin, polyacrylic, silicone, fluoroelastomers (including fluoroelastomers available under the tradename Viton™, from Chemours Co., Wilmington, Del.), polyether block amides, nitrile, neoprene, ethylene propylene, and urethane, and closed cell foams. More preferably the washer 1 comprises a material selected from the group consisting of polyurethane, neoprene, styrene-butadiene, ethylene propylene, polyvinyl chloride, nitrile, silicon, fluoroelastomers and closed cell polyurethane foams.

One example of a washer 1 comprises a closed cell polyurethane foam. In one embodiment, the washer 1 has a hole diameter of 5/16" and a thickness of 1/16" and is used to prevent self-adjusting of a glide 4 with an externally threaded ⅜" stem, which is threaded into a threaded insert with an internally threaded ⅜" nut, would be one made of closed cell polyurethane foam material, which.

The washer 1 preferably has an adhesive on one side, which is used to affix the washer to the underside of the threaded insert. In one embodiment, the adhesive may of the common peel-and-stick variety. The adhesive may be included with the washer or it may be applied separately to facilitate adhesion of the washer. Alternatively, the washer may be attached by crimping or by other mechanical means. The washer is most preferably affixed on the underside of the threaded insert, i.e. the surface of the receptacle closest to the floor, such that when the furniture leveling assembly comes under load, the polymer washer is compressed, expands, and provides greater interference between the washer and stem of the leveling glide.

As described herein, in one embodiment, the diameter of the hole of the washer 1 is smaller than the major diameter of the externally threaded stem 5 of the leveling glide 4. This creates interference between the washer 1 and the stem 5 of the leveling glide 4 that provides frictional pressure between the two, restricts rotation of the leveling glide stem 5, and prevents self-adjusting of the glide 4 inside the threaded insert 2. Additional interference is also created when the furniture leveling assembly bears the weight of the furniture. When under load, the polymer washer 1 is compressed by the threads of the stem and insert, thereby generating greater interference between the washer 1 and stem 5.

In another preferred embodiment, the diameter of the hole of the washer 1 is only slightly smaller than the major diameter of the externally threaded stem 5. This creates some level of interference between the washer 1 and stem 5, which is sufficient to help restrict self-adjustment of the glide, but that interference is not so great as to inhibit manual adjustment of the leveling glide. When a load is placed on the furniture leveling assembly, the polymer washer 1 is compressed and expands into the threads of the stem 5 and insert 2. This expansion creates greater interference between the washer 1 and stem 5 and further restricts self-adjustment of the leveling glide 4. In addition, when the polymer washer 1 comprises a resilient material, as preferred, the washer tends to return to its original shape once the load is removed, thereby relieving some of the interference between the washer 1 and stem 5 created by the load. Once this occurs, the leveling glide 4 is more easily manually adjusted.

The washer 1 of the present invention preferably comprises a flexible material that exhibits high resiliency and impact absorption. Examples of suitable materials include polymers such as isolene, isoprene, butadiene, styrene, chloroprene, isobutylene, polybutadiene, styrene-butadiene, epichlorohydrin, polyacrylic, silicone, fluoroelastomers (including fluoroelastomers available under the tradename Viton™, from Chemours Co., Wilmington, Del.), polyether block amides, nitrile, neoprene, ethylene propylene, and urethane, and closed cell foams. More preferably the washer 1 comprises a material selected from the group consisting of polyurethane, neoprene, styrene-butadiene, ethylene propylene, polyvinyl chloride, nitrile, silicone, fluoroelastomers and closed cell foams.

As describe above, the washer 1 has a thickness and center hole diameter sufficient to interfere with the threads of the stem 5 and put pressure on the stem 5. Such pressure can be increased by utilizing thicker washers, smaller diameter holes, firmer polymer material or some combination of these. Additionally, it is contemplated that a thicker washer may comprises a more compressible material that would provide greater interference with the threads of the stem 5. Other configurations would also be apparent to one skilled in the art. What is most important is that the washer interfered with the threads of the stem 5 to provide greater interference between the washer and the stem 5 of the leveling glide 4 to restriction rotation of the stem 5 and prevent self-adjustment of the glide 4 inside the threaded insert 2.

This invention can be used for other applications including any instance where an externally threaded member is screwed into an internally threaded receptacle and manual adjustment is desired, but auto-adjusting is not. Such examples include a glide threaded into a t-nut or tapped hole, a locking knob threaded into a tapped hole or weld nut, or a planar platform which is leveled using adjustment screws that thread into tapped holes in the platform support. In addition, this invention is particularly advantageous for applications that involve loading and unloading the components.

Finally, it should also be understood that the following claims are intended to cover all of the generic and specific features of the invention described herein and all statements of the scope of the invention that as a matter of language might fall there between.

What is claimed is:

1. A threaded insert for a furniture leveling assembly, the threaded insert comprising:
   i. an internally threaded surface that is configured to accommodate an externally threaded stem of a leveling glide;
   ii. a polymer washer secured to the bottom of the threaded insert with an adhesive, wherein the polymer washer is made of a closed cell polyurethane foam material, wherein a diameter of a hole of the washer is smaller than a diameter of the externally threaded stem of the leveling glide; and
   wherein, an axis of a hole of the washer is aligned with an axis of the internally threaded surface of the threaded insert; and
   wherein the leveling glide is turnable about the threaded insert to adjust a height of a tubular furniture leg and the polymer washer resists self-adjustment or rotation but permits manual adjustment by a user to any position along the externally threaded stem based on a desired height of the tubular furniture leg, such that the polymer washer retains the leveling glide at the desired height,
   wherein the polymer washer compresses and/or expands to maintain interference between the polymer washer and the externally threaded stem of the leveling glide when under a load, and wherein the polymer washer returns to its original shape once the load is removed.

2. The threaded insert of claim 1, wherein the polymer washer has a hole diameter of $5/16"$.

3. The threaded insert of claim 1, wherein the polymer washer has a thickness of $1/16"$.

4. The threaded insert of claim 1, wherein the threaded insert further includes a clip configured to interact with the tubular furniture leg.

5. A furniture leveling assembly, the furniture leveling assembly comprising:
   i. a threaded insert with an internally threaded surface;
   ii. a leveling glide with an externally threaded stem, wherein the leveling glide is configured to make contact with a floor; and
   iii. a polymer washer secured to a bottom of the threaded insert;
   wherein the internally threaded surface of the threaded insert is configured to accommodate the externally threaded stem of the leveling glide;
   wherein a diameter of a hole of the washer is smaller than a diameter of the externally threaded stem of the leveling glide; and
   wherein an axis of the hole of the washer is aligned with an axis of the internally threaded surface of the threaded insert; and
   wherein the leveling glide is turnable about the threaded insert to adjust a height of a tubular furniture leg and the polymer washer resists self-adjustment or rotation but permits manual adjustment by a user to any position along the externally threaded stem based on a desired height of the tubular furniture leg, such that the polymer washer retains the leveling glide at the desired height,
   wherein the polymer washer compresses and/or expands to maintain interference between the polymer washer and the externally threaded stem of the leveling glide when under a load, and wherein the polymer washer returns to its original shape once the load is removed.

6. The threaded insert of claim 5, wherein the polymer washer has a hole diameter of $5/16"$.

7. The threaded insert of claim 5, wherein the polymer washer also has a thickness of $1/16"$.

8. The threaded insert of claim 5, wherein the polymer washer is made of a resilient polymeric material.

9. The threaded insert of claim 5, wherein the polymer washer is made of a closed cell polyurethane foam material.

10. The threaded insert of claim 5, wherein the threaded insert further includes a clip configured to interact with the tubular furniture leg.

11. The threaded insert of claim 5, wherein the polymer washer is secured to the bottom of the internally threaded surface of the threaded insert with an adhesive.

* * * * *